P. HLEB.
NUT LOCK.
APPLICATION FILED MAY 31, 1919.
1,400,545.
Patented Dec. 20, 1921.
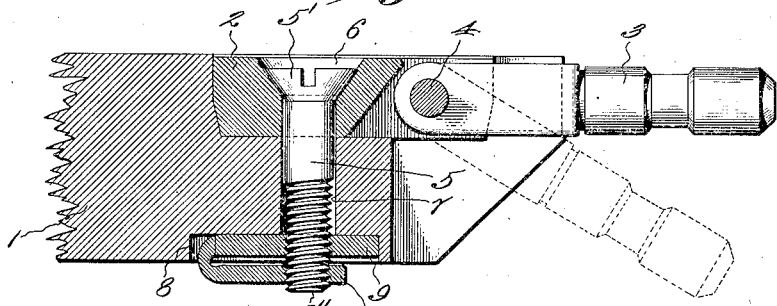
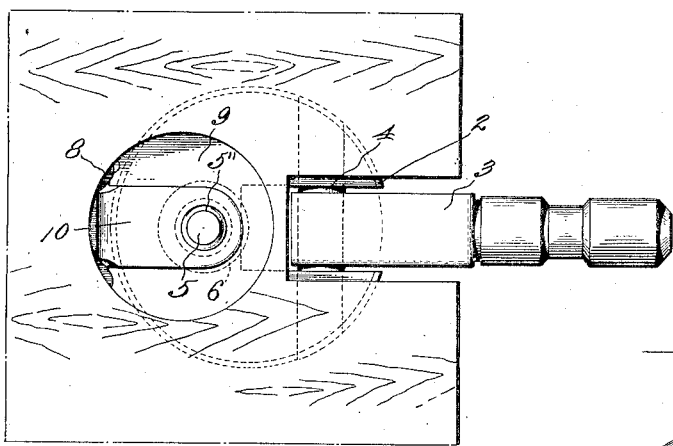
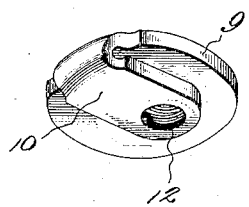
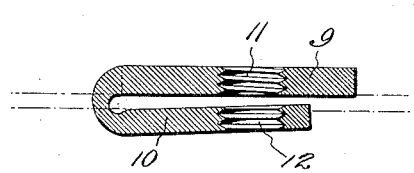
WITNESSES:
INVENTOR
Peter Hleb
BY
Henry J Miller
ATTORNEY

UNITED STATES PATENT OFFICE.

PETER HLEB, OF ELIZABETH, NEW JERSEY, ASSIGNOR TO THE SINGER MANUFACTURING COMPANY, A CORPORATION OF NEW JERSEY.

NUT-LOCK.

1,400,545.  Specification of Letters Patent.  Patented Dec. 20, 1921.

Application filed May 31, 1919. Serial No. 300,995.

*To all whom it may concern:*

Be it known that I, PETER HLEB, a citizen of the United States, residing at Elizabeth, in the county of Union and State of New Jersey, have invented certain new and useful Improvements in Nut-Locks, of which the following is a specification, reference being had therein to the accompanying drawings.

This invention relates to nut and bolt locks.

It aims to provide a new and improved form of nut and bolt lock which may be manufactured inexpensively and handled with facility.

The invention comprises essentially a nut having superimposed washer and finger portions which are drilled and tapped to one side of the geometrical center of the washer portion and afterward bent to throw the thread-lined apertures out of axial alinement so that when a bolt is threaded thereinto it will jam in the resulting distorted thread passage.

The invention is illustrated in the accompanying drawings in which Figures 1 and 2 are sectional and bottom plan views of the invention as applied to an anchoring hinge for sewing machines. Figs. 3 and 4 are perspective and sectional views of the nut.

In the drawings the construction is represented as applied to the table 1 of a cabinet or other suitable supporting member for the stationary part 2 of a hinge whose movable part 3 is pinned thereto as indicated at 4. A bolt 5 is passed through the stationary part 2, which is countersunk as indicated at 6 to receive the head 5' of the bolt whose opposite end is threaded as indicated at 5" and is passed through the hole 7 provided in the table or supporting member 1. In its lower face the table 1 is provided eccentrically of the hole 7 with a circular recess 8 which is adapted to receive the washer or disk-portion 9 of a flexible nut and to hold the same against rotation while the bolt is being threaded thereinto. The flexible nut includes an auxiliary or finger portion 10 of bar-like form integral with the washer or disk portion 9. Both the washer or disk portion 9 and the auxiliary or finger portion 10 are drilled and tapped as indicated at 11 and 12, respectively, and afterward bent to the position shown most clearly in cross-section in Fig. 4 in order to throw their thread-lined apertures 11 and 12 slightly out of axial alinement.

The manner of using the device will be clear from the illustration. When the bolt 5 is threaded into the nut it will be compelled to take into a distorted thread-passage defined by the respective thread-lines apertures in the washer and finger-portions. The respective portions of the nut being flexibly connected together will tend to grip the threads on the bolt by their movement toward each other after the end of the bolt has been threaded through the washer-portion 9 and part way through the finger portion 10. In other words, after the free end of the bolt has passed through the washer portion 9 and before it enters the finger portion 10 it will be necessary to bend the latter slightly away from the former in order to start the bolt into the thread-lined aperture 12. Thereafter, of course, the two portions of the nut tend to move together and consequently grip the threads of the bolt. In this way a fairly secure interlock is effected between the nut and the bolt.

The present invention is extremely simple in construction, may be made from a single piece of material which is bent to the nearly parallel positions indicated graphically by the dot and dash lines in Fig. 4, then drilled and tapped and finally struck lightly with a hammer to bend the washer and finger portions to the positions indicated in cross-section in Fig. 4. Thus it may be manufactured at a very low cost. The device consists of only two parts, a bolt and a nut, and is almost as easy to handle as an ordinary nut and bolt while at the same time the parts are prevented from loosening under ordinary vibration in a fairly reliable manner. While the nut does not lock the bolt as securely or firmly as some types of nut and bolt locks it is secure enough for most purposes and for the especial purpose of anchoring the type of hinge illustrated.

Having thus set forth the nature of the invention, what I claim herein is—

1. A nut comprising a substantially circular washer portion and a superposed auxiliary portion formed of resilient material and in one piece with the washer portion, both portions provided with threaded apertures slightly out of axial alinement, the aperture in the washer portion being located eccentrically thereof.

2. A nut comprising a substantially circular disk portion and a finger portion superposed thereon and formed in one piece therewith of elastic material, said portions provided with threaded openings slightly out of axial alinement and with the opening in the disk located eccentrically thereof, the center of the disk being between the center of the opening and the point of connection between the disk and finger portions.

In testimony whereof, I have signed my name to this specification.

PETER HLEB.